R. D. WHITTEMORE.
Car-Brakes.

No. 148,014. Patented Feb. 24, 1874.

Witnesses:
W. Burris
G. G. Baker

Inventor:
Robert D. Whittemore
per G. B. Fowles Att.

UNITED STATES PATENT OFFICE.

ROBERT D. WHITTEMORE, OF BELVIDERE, VERMONT.

IMPROVEMENT IN CAR-BRAKES.

Specification forming part of Letters Patent No. 148,014, dated February 24, 1874; application filed October 11, 1873.

*To all whom it may concern:*

Be it known that I, ROBERT D. WHITTEMORE, of Belvidere, in the county of Lamoille and State of Vermont, have invented certain Improvements in Brakes for Railroad-Cars, of which the following is a specification:

My invention relates to the construction of brakes for railroad cars; and consists in certain modifications and improvements therein, as hereinafter shown and described, the object of this invention being to provide a series of brakes, so arranged and connected that it may be readily operated either by hand or by checking the speed of the forward car.

Figure 1:
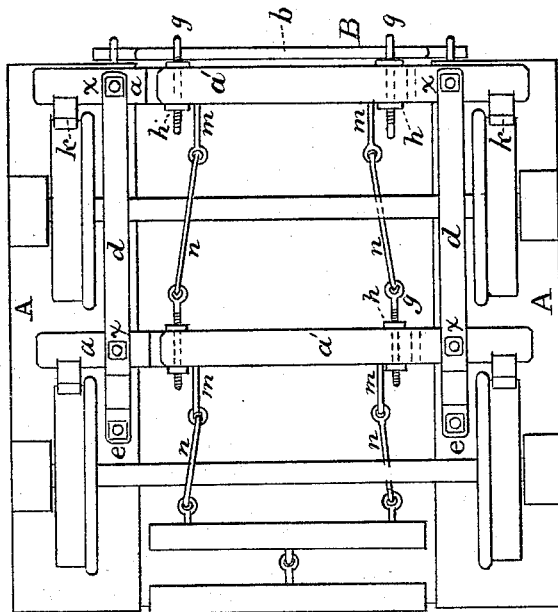
Figure 3:
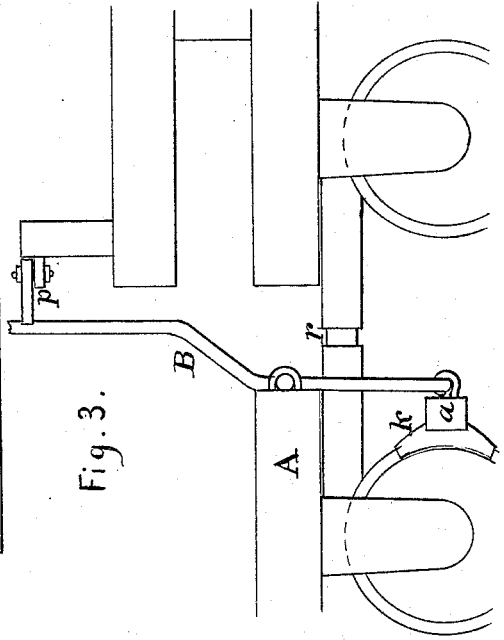
Figure 2:
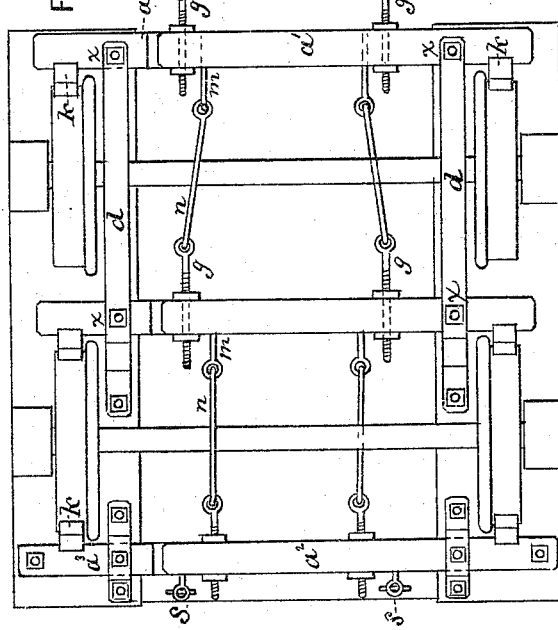
Figure 2:
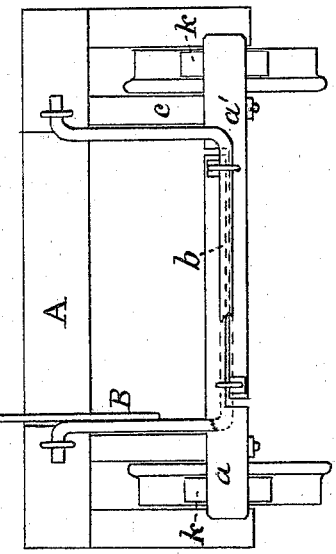

In the accompanying drawing, which illustrates my invention, and forms a part of the specification thereof, Figure 1 is a bottom view of car-truck with my invention applied thereto. Fig. 2 is an end view. Fig. 3 is a partial side view of cars.

In the drawing referred to, A designates the frame of the forward car-truck, to the fore end of which is hinged or coupled the lever B, the said lever being constructed to extend along the foremost brake-bars, as shown in Fig. 2. The brake-bars consist of the parts $a\ a'$, which are pivoted to the lower ends of the posts $c$, and held in position by said pieces and the bars $d$, which are bolted to the frame at $e$. The threaded rods or screw-bolts $g$, having the nuts $h$, so as to be lengthened, if desired, pass through the bars $a\ a'$, the latter being formed one to overlap the other, as shown in Fig. 2. The shoes indicated by letter $k$ are fixed to the brake-bars near the outer extremities, so that an outward movement of part $b$ of lever B, the bars $a\ a'$ being coupled thereto, causes the shoes to bear against the wheels.

As shown in Fig. 1, the forward brake-bars are connected with similar bars to operate in like manner against the hind wheels by means of the rods and links $m$ and $n$, and the system of brakes is continued to the next truck through coupled bars $o$ linked, as before, to the parts $a\ a'$ of the brake-bars, so that by one line of links and rods the parts $a$ of the brake-bars are all connected to lever B, and by another line the parts $a'$ are likewise connected to the said lever.

By this construction and arrangement (the parts $a\ a'$ being pivoted at $x$) the whole series of brake-bars is operated by a single movement of lever B. The same operation is effected by the attachment of the brake-table, designated $p$, to the tender or car preceding the truck A, as illustrated in Fig. 3. The speed of the preceding car being checked, as the car-coupling $r$ contracts, the lever B projecting forward, as shown in the figure, is caught by the brake-table $p$, thus causing the brakes to operate, as before stated. An additional brake may be applied to the rear wheels of the hindmost truck composed of parts $a^2\ a^3$, and connected by means of links and rods with the former. The springs designated $s$ are used to release the wheels from the operation of the brakes.

Having described my invention, I claim—

The compound car-brake, consisting of bars $a\ a^1$ pivoted to posts $c\ c$, and connected by links and rods to lever B, and having springs $s$, all constructed to operate as set forth.

ROBERT DAVIS WHITTEMORE.

Witnesses:
WILLIAM J. ROBERTSON,
GEO. J. ALDRICH.